United States Patent
Straetmans et al.

(10) Patent No.: US 7,846,859 B2
(45) Date of Patent: Dec. 7, 2010

(54) AMBER GLASS

(75) Inventors: Jean-Sebastien Straetmans, Chartres (FR); Simon Flink, Eindhoven (NL); Theodorus Herman Ketelaar, Eindhoven (NL); Raoul Hendrinkus Elisabeth Maria Martens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 12/067,843

(22) PCT Filed: Sep. 21, 2006

(86) PCT No.: PCT/IB2006/053411

§ 371 (c)(1),
(2), (4) Date: Mar. 24, 2008

(87) PCT Pub. No.: WO2007/034429

PCT Pub. Date: Mar. 29, 2007

(65) Prior Publication Data

US 2008/0261798 A1    Oct. 23, 2008

(30) Foreign Application Priority Data

Sep. 23, 2005   (EP) .................... 05300766

(51) Int. Cl.
*C03C 3/085* (2006.01)
*C03C 3/083* (2006.01)
*C03C 3/087* (2006.01)
*C03C 3/078* (2006.01)
*H01J 29/86* (2006.01)

(52) U.S. Cl. ............... 501/70; 501/68; 501/69; 501/72; 313/480

(58) Field of Classification Search ........... 501/69, 501/70, 72, 35, 68; 313/480
See application file for complete search history.

(56) References Cited

U.S. PATENT DOCUMENTS

| | | | | |
|---|---|---|---|---|
| 4,867,779 A | * | 9/1989 | Meunier et al. | 71/62 |
| 5,037,470 A | * | 8/1991 | Matzen et al. | 71/52 |
| 6,469,443 B1 | * | 10/2002 | Bryant et al. | 313/636 |
| 2002/0042338 A1 | * | 4/2002 | Oyama et al. | 501/72 |
| 2002/0117950 A1 | * | 8/2002 | Ulenaers et al. | 313/112 |
| 2005/0209083 A1 | * | 9/2005 | Takagi et al. | 501/11 |

FOREIGN PATENT DOCUMENTS

| EP | 1193226 A1 | 4/2002 |
|---|---|---|
| WO | 0246116 A1 | 6/2002 |

* cited by examiner

*Primary Examiner*—Jerry Lorengo
*Assistant Examiner*—Noah S Wiese

(57) ABSTRACT

A colored glass has a formula of $R'_2O$—$RO$—$SiO_2$, wherein R' is an alkali metal element and R is an alkaline earth metal element. The colored glass comprises between 0.01 and 1% by weight of molybdenum expressed as $MoO_3$ and between 0.01 and 2.5% by weight of sulfur expressed as $SO_3$. The colored glass further comprises between 7.8 and 14% by weight of potassium expressed as $K_2O$ and between 0.68 and 5.42% by weight of sodium expressed as $Na_2O$. The sum of the concentrations of potassium and sodium expressed as $K_2O$ and $Na_2O$ is between 11 and 17% by weight.

4 Claims, 2 Drawing Sheets

AMBER GLASS

FIELD OF THE INVENTION

The present invention relates to an amber colored glass and an electric lamp comprising an envelope of such amber glass. The present invention is particularly relevant for signal lighting in automotive applications.

BACKGROUND OF THE INVENTION

An electric lamp comprising an amber glass envelope is described in patent EP1193226. The colored glass has a formula of $R'_2O$—$RO$—$SiO_2$, wherein R' is an alkali metal element and R is an alkaline earth metal element. The colored glass comprises molybdenum (Mo) and sulfur (S), which together give the amber color to the glass. The molybdenum is added in the proportion of 0.01 to 0.6% of weight (expressed in the oxidic form) and the sulfur is added in the proportion of 0.01 to 1% of weight (expressed in the oxidic form). Although the proportion of molybdenum and sulfur in the obtained glass is not given in this patent, the applicant has noted that an amber glass suitable for signal lighting may comprise between 0.01 and 1% by weight of molybdenum expressed in oxidic form and between 0.01 and 2.5% by weight of sulfur expressed in oxidic form. It is to be noted that it is conventional in the field of glass science to express the proportion of a constituent as the oxidic form. Hence the percentage of Mo is expressed as the weight percentage of $MoO_3$ and the percentage of S is expressed as the weight percentage of $SO_3$. However, this does not mean that this constituent is only present in the glass under this oxidic form. The constituent may be present in various forms, and it is even possible, for instance, that the glass does not contain the oxidic form of the element.

However, the amber glass described in this patent appears to be fragile, which is a drawback because an electric lamp made with this glass may easily be broken during operation or even before it is used in a dedicated automotive application.

SUMMARY OF THE INVENTION

It is an object of the invention to provide a colored glass, in particular an amber glass suitable for automotive signal lighting, which shows improved stress.

To this end, the invention proposes a colored glass having a formula of $R'_2O$—$RO$—$SiO_2$, wherein R' is an alkali metal element and R is an alkaline earth metal element, said colored glass comprising between 0.01 and 1% by weight of molybdenum expressed as $MoO_3$ and between 0.01 and 2.5% by weight of sulfur expressed as $SO_3$, said colored glass further comprising between 7.8 and 14% by weight of potassium expressed as $K_2O$ and between 0.68 and 5.42% by weight of sodium expressed as $Na_2O$, wherein the sum of the concentrations of potassium and sodium is between 11 and 17% by weight.

Analysis of the colored glass of the prior art led to the conclusion that this prior art glass comprises a relatively high concentration of crystals in a zone located near the inner wall of the electric lamp or tube made of this glass. Now, crystals in glass create permanent tension zones that are located around the crystals. An electric lamp or tube manufactured in accordance with the prior art thus comprises tension zones on its inner wall. When a load is applied on the outer wall of the electric lamp or tube (for instance when the products are handled by machines or humans beings), the outer wall is under compressive stress whereas the inner wall is under tensile stress. As there are already tension zones near the inner wall, these tension zones quickly propagates and the glass envelope easily breaks. It is well known that in general crystals make the glass more fragile, as can be seen from 'The technology of glass and ceramics', which is the 4th book in the series 'Glass Science and Technology', by J. Hlaváč, published by Elsevier Scientific Publishing Company, 1983, ISBN 0-444-41577-7.

The applicant has noticed that the presence of crystals in the glass is due to the presence of molybdenum and sulfur that are used for coloring the glass. Actually, a glass prepared with a first recipe with Mo and S comprises a lot of crystals, while glasses prepared with the same recipe, but without Mo or without S, comprise no crystals. This demonstrates that the presence of crystals is due to the fact that the glass is colored, which is due to Mo and S. A clear glass does not comprise crystals, which means that the problem mentioned above, namely the fragility of the glass, only arises with amber glasses based on Mo and S.

As will be shown in the detailed description, a proper choice of the concentrations of potassium and sodium allows reduction of the concentration of the crystals, thus leading to a less fragile glass.

These and other aspects of the invention will be apparent from and will be elucidated with reference to the embodiments described hereinafter.

BRIEF DESCRIPTION OF THE DRAWINGS

The invention will now be described in more detail by way of example with reference to the accompanying drawing, in which.

DETAILED DESCRIPTION OF THE INVENTION

Figure 1:
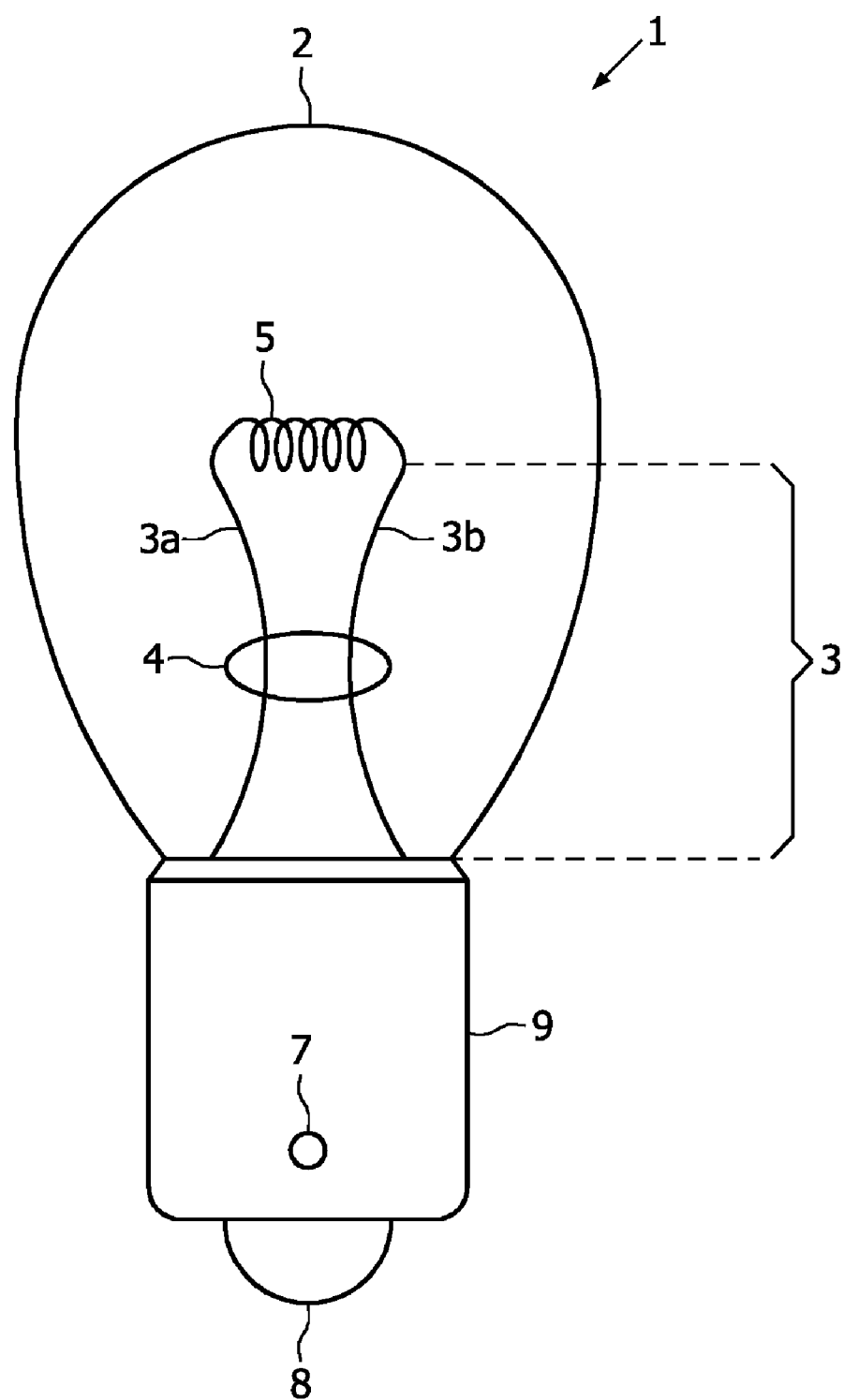
FIG. 1 shows an electric lamp in accordance with the invention.

FIG. 1 shows an electric automotive signal lamp 1 also called indicator lamp comprising:

- a lamp envelope or bulb 2 made out of amber coloured glass, having a wall thickness comprised between, for example, 0.3 mm and 1.3 mm,
- a mount 3, comprising two lead in wires 3a and 3b hold by a bead 4 mounted inside the glass bulb 2 for supporting a coiled filament 5,
- a locations pin 7 from the metal cap 9 to fit in an holder of the luminary, the relative positioning of said location pin 7 being such as it is impossible to mount the wrong lamp type in a specific luminary (e.g. it is made therewith impossible to mount a clear lamp in a luminary meant for an amber lamp),
- an electric contact 8 connected to the mount 3 for the lamp to be electrically supplied by the electric circuits of the car,
- a metal cap 9 to fit in a holder of the lamp holder.

The envelope of the electric lamp of FIG. 1 is made of a colored glass in accordance with the invention. The starting materials for making the amber glass are sand, carbon or a reducing agent like carbon, a molybdenum containing raw material, sodium sulfate, lithium carbonate, sodium carbonate, potassium carbonate, limestone, barium carbonate, strontium carbonate, magnesium oxide. The general formula of the main part of the glass is $R'_2O$—$RO$—$SiO_2$, wherein R' is an alkali metal element and R is an alkaline earth metal element, as described in patent EP1193226.

An electric lamp in accordance with an advantageous embodiment of the invention has a glass bulb with a glass composition comprising the chemical components as listed in Table 1.

TABLE 1 advantageous chemical composition of a glass bulb according to the invention

| Component | Weight % |
|---|---|
| $SiO_2$ | 60-75 |
| $Al_2O_3$ | 0.1-7 |
| $Li_2O$ | 0.1-2.5 |
| $Na_2O$ | 0.68-5.42 |
| $K_2O$ | 7.8-14 |
| MgO | 0.1-3 |
| CaO | 0.1-5 |
| SrO | 0.1-10 |
| BaO | 5-15 |
| $MoO_3$ | 0.01-1 |
| $SO_3$ | 0.01-2.5 |

An electric lamp in accordance with a preferred embodiment of the invention has a glass bulb with a glass composition comprising the chemical elements as listed in Table 2.

TABLE 2 preferred chemical composition of a glass bulb according to the invention

| Component | Weight % |
|---|---|
| $SiO_2$ | 67.6 |
| $Al_2O_3$ | 0.74 |
| $Li_2O$ | 1.17 |
| $Na_2O$ | 1.89 |
| $K_2O$ | 12.53 |
| MgO | 2.45 |
| CaO | 3.84 |
| SrO | 2.09 |
| BaO | 7.22 |
| $MoO_3$ | 0.06 |
| $SO_3$ | 0.29 |

In these tables, the percentages by weight of the oxidic forms of the chemical elements are given. This does not necessary implies that these elements are present in the glass under this oxidic form. For example, potassium in the glass may be present as K or other forms of potassium.

$SiO_2$ serves as a network former in the glass. The $SiO_2$ content is limited to 60-75% by weight, leading in combination with the other constituents to a readily meltable and processable glass. $Al_2O_3$ improves the chemical resistance of the glass. BaO has the favorable property that it increases the electric resistance of the glass and reduces the softening temperature of the glass. The alkaline-earth metal-oxides SrO, MgO and CaO have the favorable property that they reduce the liquefying temperature and the melting temperature of the glass.

The glass may additionally contain some $Fe_2O_3$ as an impurity originating from the raw materials used. Also $TiO_2$, $ZrO_2$ and MnO can be found as trace elements.

In order to obtain a glass that is suitable for automotive lighting, it is necessary that the sum of the concentrations of potassium and sodium expressed in oxidic forms is between 11 and 17% by weight. Actually, if this sum is outside this range, the glass does not have the melting and processing properties required for bulb making; moreover the thermal expansion coefficient of the glass is not suitable for sealing the glass to the current supply conductors or lead in wires of the electric lamp. This is why this sum is always chosen in this range, as is the case, for instance, in patent EP1193226.

The invention aims at increasing the strength of the amber glass. As it has been described hereinbefore, the fragility of the amber glass of the prior art is mainly due to the presence of crystals near the inner wall of the glass envelope, which are due to the presence of Mo and S in the glass. The applicant has noted that it is possible to drastically reduce the density of crystals near the inner wall of the glass envelope in that suitable concentrations of potassium and sodium are chosen.

The glass making process is described hereinafter. A batch is prepared by weighing and mixing all required raw materials mentioned above. The batch is fed to a conventional continuous melting tank. Standard process settings are used for melting, refining and conditioning of tube forming process.

Glass tubes are made at the end of the glass manufacturing process using standard tube drawing technics At a later stage, bulb forming is obtained by tube heating.

Various glasses were prepared with the above-described process. The various samples that were prepared have substantially the same composition, which is substantially the composition given in Table 2, except for the concentrations of Na and K, which were varied in order to evaluate the influence of Na and K on the crystal density. Table 3 gives the concentrations of Na and K in the seven samples that were prepared.

TABLE 3

Weight percent of $Na_2O$ and $K_2O$ of the prepared amber glass samples

| | Sample → | | | | | | |
|---|---|---|---|---|---|---|---|
| | 1 | 2 | 3 | 4 | 5 | 6 | 7 |
| $Na_2O$ | 8 | 6.72 | 5.42 | 4.1 | 2.82 | 1.5 | 0.68 |
| $K_2O$ | 5 | 6.4 | 7.8 | 9.2 | 10.6 | 12 | 14 |

Figure 2:
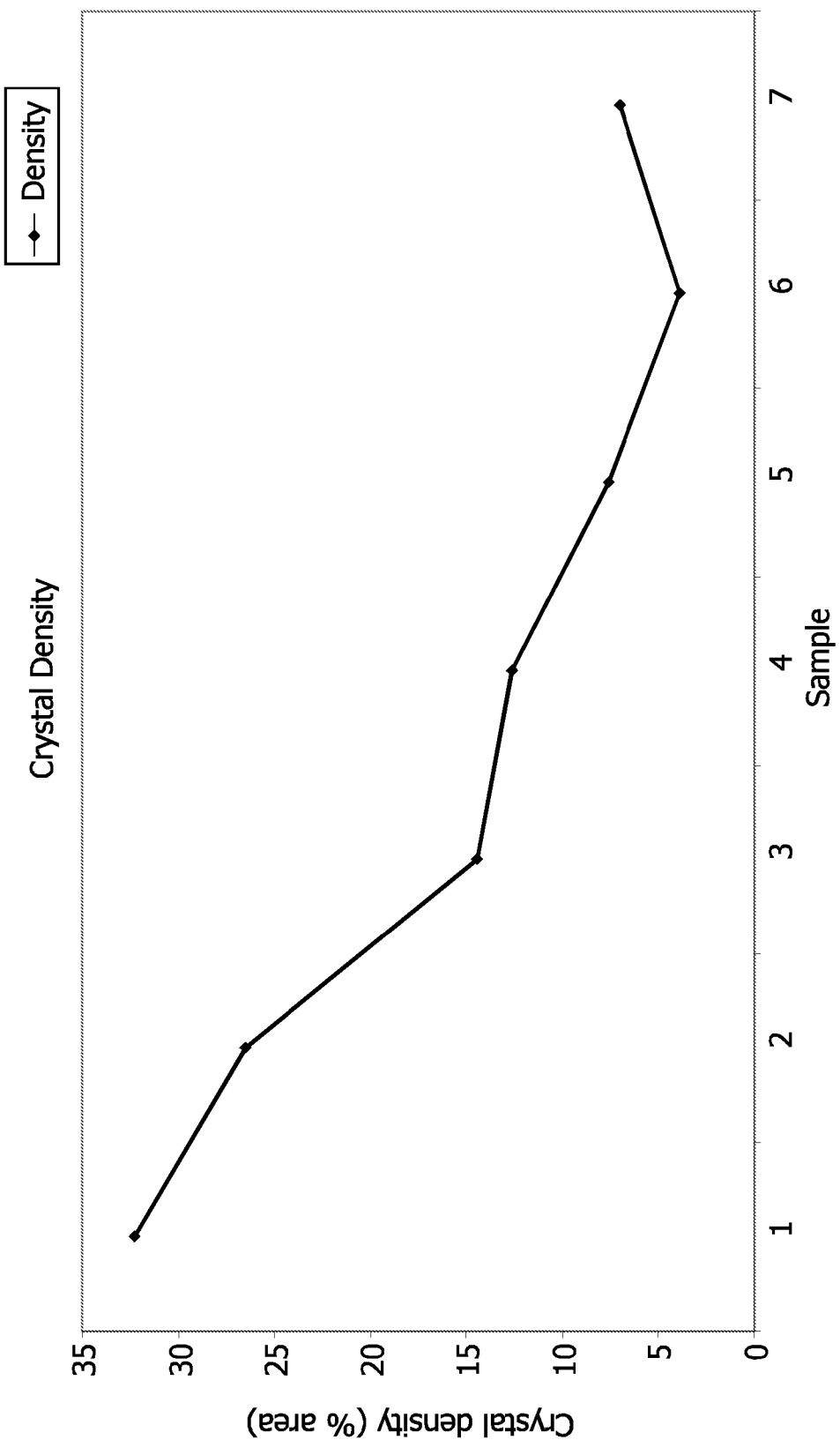
FIG. 2 shows crystal densities in amber glasses prepared with various concentrations of sodium and potassium.

For each experiment, a portion of a sample of a predetermined size was selected and the area of crystals in this portion was calculated using the program Halcon available from company MvTec®. The size of a picture of said portion was 640*480 pixels, the number of pixels belonging to crystals was counted in each picture and divided by the total number of pixel of the picture. The crystal density in each sample was thus evaluated. FIG. 2 shows the crystal density for each sample, expressed as the percentage of the total area of the sample that is covered by crystals. As can be seen from FIG. 2, the crystal density of the first two samples, where the concentration of sodium is higher than the concentration of potassium, is relatively high. This leads to fragile glasses. Sample 1 substantially corresponds to the glass composition given in EP1193226. The crystal density in samples 3 to 7 is much lower than in samples 1 and 2, which means that these glasses are relatively more robust. This shows that by choosing the amount of potassium and the amount of sodium in such a way that the colored glass comprises between 7.8 and 14% by weight of potassium expressed as $K_2O$ and between 0.68 and 5.42% by weight of sodium expressed as $Na_2O$, a more robust glass is obtained than in the prior art, said more robust glass being suitable for automotive applications. The lower crystal density was obtained with the glass having the composition given in Table 2.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A colored glass composition having a formula of $R'_2O$—$RO$—$SiO_2$, wherein $R'$ is an alkali metal element and R is an alkaline earth metal element, said colored glass composition comprising:

between 0.01 and 1% by weight of molybdenum expressed as $MoO_3$ between 0.01 and 2.5% by weight of sulfur expressed as $SO_3$, between 7.8 and 14% b weight of potassium expressed as $K_2O$ and between 0.68 to less than 5% b weight of sodium expressed as $Na_2O$, wherein the sum of the concentrations of potassium and sodium is between 11 and 17% by weight, wherein the glass composition, expressed in percentage by weight of the oxidic forms further comprises:

| Component | Weight % |
| --- | --- |
| $SiO_2$ | 60-75 |
| $Al_2O_3$ | 0.1-7 |
| $Li_2O$ | 0.1-2.5 |
| MgO | 0.1-3 |
| CaO | 0.1-5 |
| SrO | 0.1-10 |
| BaO | 5-15. |

2. A colored glass composition having a formula of $R'_2O$—$RO$—$SiO_2$, wherein $R'$ is an alkali metal element and R is an alkaline earth metal element, said colored glass composition comprising:

| Component | Weight % |
| --- | --- |
| $SiO_2$ | 67.6 |
| $Al_2O_3$ | 0.74 |
| $Li_2O$ | 1.17 |
| $Na_2O$ | 1.89 |
| $K_2O$ | 12.53 |
| MgO | 2.45 |
| CaO | 3.84 |
| SrO | 2.09 |
| BaO | 7.22 |
| $MoO_3$ | 0.06 |
| $SO_3$ | 0.29. |

3. An electric lamp comprising a glass envelope made of colored glass composition as claimed in claim 1.

4. An electric lamp comprising a glass envelope made of colored glass composition as claimed in claim 2.

* * * * *